Sept. 30, 1969  G. DORNBERGER ET AL  3,470,463
ROTATABLE, COUNTERWEIGHTED ELECTRODE PROBE AND CARRIAGE
APPARATUS FOR CAPACITIVELY MEASURING THE OUTER
SHEATH OF MOVING CONDUCTOR CABLE
Filed April 28, 1967  3 Sheets-Sheet 1
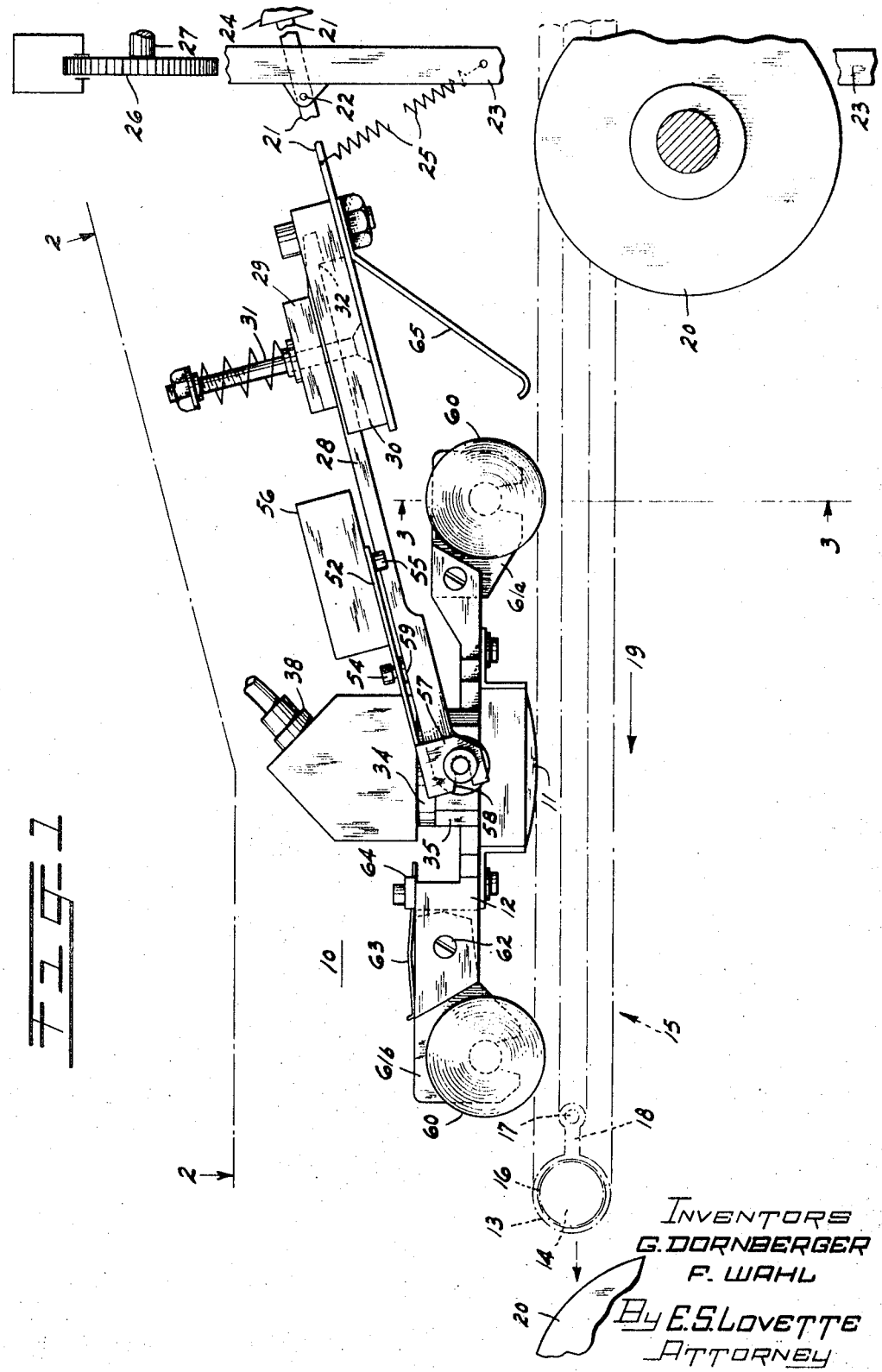
INVENTORS
G. DORNBERGER
F. WAHL
By E.S. LOVETTE
ATTORNEY Sept. 30, 1969  G. DORNBERGER ET AL  3,470,463
ROTATABLE, COUNTERWEIGHTED ELECTRODE PROBE AND CARRIAGE
APPARATUS FOR CAPACITIVELY MEASURING THE OUTER
SHEATH OF MOVING CONDUCTOR CABLE
Filed April 28, 1967  3 Sheets-Sheet 2
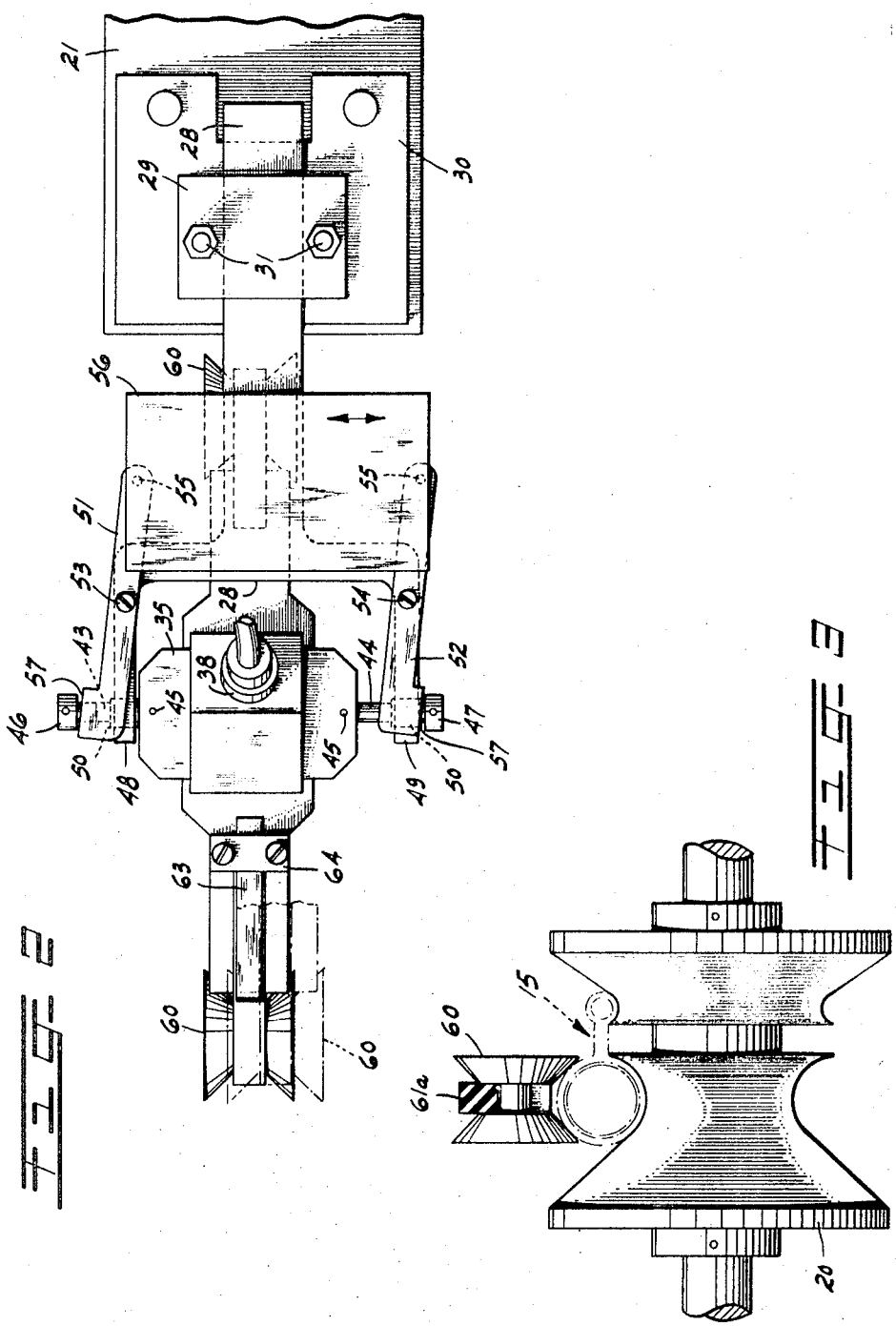

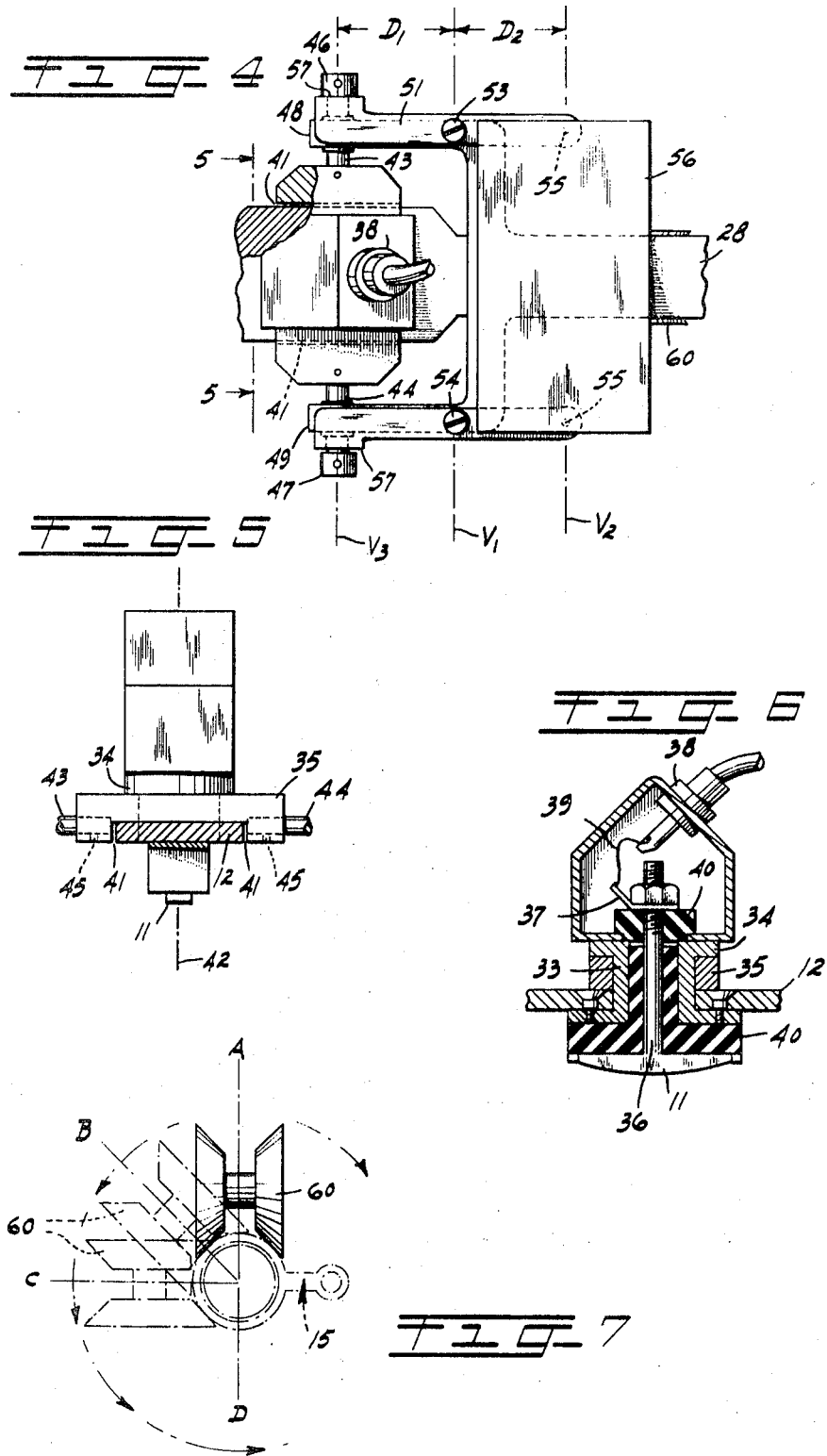

United States Patent Office 3,470,463
Patented Sept. 30, 1969

3,470,463
ROTATABLE, COUNTERWEIGHTED ELECTRODE PROBE AND CARRIAGE APPARATUS FOR CAPACITIVELY MEASURING THE OUTER SHEATH OF MOVING CONDUCTOR CABLE
Georg Dornberger, Phoenix, Ariz., and Frank Wahl, North Bergen, N.J., assignors to Western Electric Company, Incorporated, New York, N.Y., a corporation of New York
Filed Apr. 28, 1967, Ser. No. 634,636
Int. Cl. G01r 27/26
U.S. Cl. 324—61                                   7 Claims

ABSTRACT OF THE DISCLOSURE

Electrode probe apparatus designed to ride on advancing cable for monitoring the capacitance between the probe and a metal jacket underlying the plastic sheath on which the probe is positioned and characterized by a lever system linking a probe carriage assembly with a counterweight for maintaining the carriage assembly in operative position on the cable as the carriage assembly is indexed to different angular positions about the cable axis.

BACKGROUND OF THE INVENTION

Field of the invention

This invention relates to electrode probe apparatus for measuring the thickness and concentricity of the outer sheath of electrical cable, and in particular, the invention concerns a lever system incorporated as part of the apparatus for maintaining the probe carriage assembly, and thus the probe in operative contact with the cable as the probe is indexed about the cable axis.

Description of the prior art

Reference may be made to U.S. Patent 2,872,640 issued to W. T. Eppler on Feb. 3, 1959, for background information concerning the field in which the instant invention relates and for an illustration of prior art. Briefly, the thickness and concentricity of the outer plastic sheath of the cable are normally determined by measuring the capacitance between the electrode probe and a metal jacket or shield underlying the plastic sheath. Precision of measurements requires that the electrode probe adhere to accurate alignment as it engages the cable surface during measurements. In the above cited patent, the probe apparatus is provided with guiding elements which grip the cable for maintaining the probe in proper alignment and operative engagement along the cable surface.

SUMMARY OF THE INVENTION

The instant invention is designed to accommodate cable, such as self-supporting cable which by reason of its structure does not allow the use of cable gripping means of the type shown in the aforementioned Eppler patent. On the other hand, the probe apparatus can be used equally as well to measure normal cylindrical cable. In accordance with the invention, the probe apparatus is provided with grooved rollers designed to rotate axially along the traveling cable and slide thereon when indexing about the cable axis without gripping same. When the probe apparatus is indexed about the cable axis, in particular, away from a vertical plane, such as, the top of the cable or the diametrically opposite cable bottom, the effects of gravity on the apparatus would ordinarily cause the probe carriage to slip off the cable surface except for the lever system disclosed herein and incorporated in such apparatus. The lever system contemplates a counterweight having a mass selected to balance the probe carriage structure so that the gravitational effects on the apparatus for indexed positions about the cable axis are nullified, wherein the probe is maintained in proper contact with the cable thus affording accurate measurements of the cable sheath.

As a further advantage, the lever system allows the probe carriage to follow cable wobble and shipping that is to say, when the cable is offset from its normal central lengthwise position, without interfering with precision measurements of the cable sheath.

The invention also contemplates a protective device for lifting temporarily the entire probe apparatus in response to sensing a cable surface irregularity or protuberance to avoid damage to the apparatus and, in particular, the probe electrode.

BRIEF DESCRIPTION OF THE DRAWING

Further objects and advantages will become apparent from the following description of the invention taken in conjunction with the figures in which:

FIG. 1 is a side elevational view of electrode probe apparatus in accordance with the invention;

FIG. 2 is a top elevational view of the apparatus taken along line 2—2 of FIG. 1;

FIG. 3 is a side elevational view along line 3—3 of FIG. 1;

FIG. 4 is a top plan view partly in section for illustrating one operative condition of the lever system in comparison to that shown in FIG. 2;

FIG. 5 is a section through line 5—5 of FIG. 4;

FIG. 6 is a side elevation in section illustrating the probe assembly employed herein; and FIG. 7 illustrates schematically positions of the probe apparatus about the cable axis.

DETAILED DESCRIPTION

Reference is now made to the figures showing the probe positioning apparatus 10 in accordance with the invention. Probe apparatus 10 includes an electrode probe 11 in conjunction with capacitance measuring test apparatus (not shown) mounted in the mid-portion of a carriage frame 12. Probe 11 is adapted to measure the concentricity and thickness of the outer insulation sheath 13 of the current conducting section 14 of self-supporting cable 15.

Cable 15 is a self-supporting cable of the type shown in U.S. Patent 3,207,836 issued to H. C. Slechta and has a figure 8-like shape in cross section; see FIGS. 1 and 3. A plurality of individual insulated current conducting wires are contained in the cable core section 14. These wires are surrounded by a conductive shield 16. The smaller diameter cable section 17 comprises stranded steel support wire and serves solely to support the cable core section 14 when cable 15 is suspended during actual use between spaced supports such as upright poles. Both cable sections 14, 17 are surrounded by an integral outer insulator sheath 13 which includes a joining web 18.

After sheath 13 is applied to cable 15, the cable is advanced in travel as depicted by arrow 19, FIG. 1. Spaced rotatable guide rollers 20, 20 support the moving cable 15 against sag and lateral wobble, and also position the cable to allow measurements of cable section 14 and not sections 17 and 18. Probe apparatus 10 is supported between rollers 20, 20 by a counterbalanced and spring biased support arm 21 whereby probe 11 is urged and normally held in slidable and aligned operative contact with sheath 13 of cable section 14.

Arm 21 is pivotally supported at 22 by a surrounding frame structure 23. A counterweight 24 to the right of pivot 22 balances the aggregate weight of arm 21 and the probe apparatus 10 supported thereby to the left of the fulcrum. Counterweight 24 is designed to neutralize the gravitational effects of arm 21 and the supported apparatus 10 for all set positions about the cable axis. The contact force for operatively holding probe 11 slidable against the moving cable sheath 13 is provided by a spring 25 tied between arm 21 and frame 23.

Indexing means depicted as ring gear 26 is rotatable in both directions about the axis of its drive shaft 27. As well known in the art, gear 26 engages a toothed portion of frame structure 23 to index structure 23 and thus the arm 21 and probe apparatus 10 carried thereby to set positions about the longitudinal axis of cable section 14. This arrangement allows probe 11 to sense and measure cable sheath 13 of section 14 for various set angular positions about the cable axis. FIG. 7 depicts examples of set positions of the probe apparatus about the cable.

Arm 21 is coupled to a connecting member 28 one end of which is insertable between blocks 29 and 30, which blocks are held together by a pair of spring-biased bolts 31. The right end (FIG. 1) of member 28 latches at 32 over block 30.

The probe assembly (FIGS. 5 and 6) supported by carriage frame 12 includes a bushing 33 provided with a collar 34. A yoke 35 has a central opening which fits over bushing 33. Yoke 35 is clamped between carriage frame 12 and collar 34. The invention contemplates a conventional electrode probe 11. Consequently, it will be understood that electrode probe 11 has an upright stem 36 making electrical contact to a clamped lug 37, which lug is electrically connected to a coaxial connector 38 by a wire 39. Coaxial connector 38 provides connection to a capacitance measuring test apparatus (not shown). Electrical insulator means 40 isolates conductive probe 11 from adjacent conductive structure of the probe assembly. The bottom face of yoke 35 has a milled slot 41 (FIGS. 4 and 5) slightly wider than the width of carriage frame 12, whereby yoke 35 straddles the carriage frame with sufficient operative swivel action about the vertical axis 42 seen in FIG. 5.

A pair of aligned shafts 43, 44 are keyed to opposite sides of yoke 35 by locking pins 45. Shafts 43, 44 do not rotate. Shafts 43, 44 project outwardly from opposite sides of yoke 35 along an axis $V_3$ (FIG. 4) making a right angle with the longitudinal axis of carriage frame 12. The right angle relationship is modified slightly when the yoke 45 swivels by reason of slot 41. Axis $V_3$ is directly over the contact point probe 11 and is designed to make contact with the cable 15.

Limit stop collars 46, 47 are locked to respective shaft ends. The left end (FIGS. 2 and 4) of member 28 has a pair of parallel arms 48, 49 provided with bearings 50, whereby the end of each arm 48, 49 is slidably and rotatably mounted on a respective shaft 43, 44 between the sides of yoke 35 and collars 46, 47. Individual ones of a pair of parallel linkages 51, 52 made of spring steel, are pivotally secured at 43, 44 to respective arms 48, 49. The right ends (FIGS. 2 and 4) of linkages 51, 52 are rotatably secured at 55, 55 to opposite sides of a counterweight 56. The left ends of linkages 51, 52 have similar depending tabs 57, 57 (only one is shown in FIG. 1). Tabs 57, 57 have open ended slots 58 for slidably and rotatably mounting the individual linkages 51, 52 over respective shafts 43, 44 with sufficient mechanical play therebetween for reasons to be explained hereinafter. As illustrated, the tab end of linkage 51 is mounted on shaft 43 between colalr 46 and arm 48; whereas, the tab end of linkage 52 is mounted on shaft 44 between collar 47 and arm 49. Preferably very small working clearances are provided between the linkage tabs 57 and their respective collars 46, 47. Pivots 53, 54 include individual spacers 59 (one is shown in FIG. 1) to maintain mechanical working clearances between the adjacent arms 48, 49 and linkages 51, 52.

The axes $V_1$ and $V_2$ (see FIG. 4) through pivots 53, 54 and through pivots 55, 55 are parallel to the axis $V_3$ of aligned shafts 43, 44. For reasons explained hereinafter, parallel linkages 51, 52 operate as a lever system pivotal both clockwise and counterclockwise about pivots 53, 54, (FIGS. 2 and 4) for maintaining continuously in balance the weight of mass 56 against the aggregate weight of the carriage assembly. The latter aggregate weight contemplates the weight of carriage frame 12 and the components rigidly fixed thereto, such as, the probe assembly, shafts 43, 44, the collars thereon, two guide wheels 60, and the carrier structures 61a, b, thereon and in addition, the slight excess weight, if any, of linkages 51, 52, apportioned to the carriage assembly mass for the purpose of balancing the foregoing described lever system. If linkages 51, 52, are balanced weightwise about pivots 53, 54, no compensating weight need be apportioned to the carriage assembly mass to balance out counterweight 56.

The foregoing counterbalanced lever system becomes operatively active when the probe positioning apparatus 10 is rotatably oriented away from either horizontal position on cable 15, i.e., the position at the top of the cable or the position diametrically opposite beneath the cable. The horizontal positions are depicted as positions A and D in FIG. 7. For all positions therebetween wherein the foregoing lever system becomes operatively active, axis $V_3$ will have a vertical component. At position C, axis $V_3$ is vertical without any horizontal component. The system allows the selection of a convenient lever ratio. For example, the weight of mass 56 is selected to equal the aggregate weight of the carriage assembly mass counterbalanced thereby, consequently, lever distances (FIG. 4) $D_1$ and $D_2$ are equal.

Individual and similar grooved guide wheels 60 are snap-locked to respective wheel carriers 61a, b (FIG. 1) at the leading and trailing ends of carriage frame 12. Wheels 60, 60 rotatably engage the cable surface without gripping same as cable 15 is advanced. When the carriage assembly indexes about the cable axis, the grooved wheels 60, 60 slide along the cable surface. The snap lock arrangement permits interchange of wheels for testing cable of various sizes. As understood in the art, wheels 60, 60 are supported by carrier frame 12 to maintain electrode probe 11 in operative contact with cable surface. Leading carrier 61a is anchored in fixed relationship to carrier frame 12. Trailing carrier 61b is pivotally anchored to carrier frame 12 and can experience a slight rotation about its pivot 62 (FIG. 1) to accommodate cable surface irregularities without interference with proper probe contact with cable 15. Trailing carrier 61b is biased by one end of a return spring 63, the other end of which is anchored by a strap 64 to carrier frame 12.

A depending member 65 (FIG. 1) is secured at its upper end to arm 21. The lower end of member 65 is curved and closely spaced to the cable surface. A large protuberance along the cable surface will strike arm 65 and raise the entire probe positioning apparatus 10 against return spring 25 to clear the passing protuberance thereby avoiding damage to probe 11.

The following described operation occurs regardless of the position of the carriage assembly about the axis of cable 15. The term carriage assembly now contemplates carriage frame 12 and the components rigidly fixed thereto, such as the probe assembly, shafts 43, 44, the collars thereon, guide wheels 60, and the wheel carriers 61a, b. Whenever cable 15 shifts side-to-side or otherwise translates laterally with respect to its axis, such action will cause the carriage assembly to follow the laterally offset cable. FIG. 2 illustrates in solid outline the carriage in an offset status. The phantom outline depicts the position of the carriage assembly following a uniformly straight cable path. In FIG. 2, the offset is depicted upwardly, hence the entire carriage assembly shifts upwardly relative to arm 21. Arm 21 and coupled member 28 do not shift since they are connected to the supporting frame structure 23. The foregoing action causes shafts 43, 44 to slide upwardly relative to the fixed arms 48, 49.

Simultaneously the two linkages 51, 52 pivot in unison clockwise about their respective pivots 53, 54, whereby counterweight 56 translates laterally in a downwardly direction. Maximum lateral shift of carriage frame 12 with respect to parallel arms 48, 49 is regulated by the clearance length of the exposed shaft 43, 44 and by the tab end of linkage 51 abutting against its limit stop 46, as arm 48 abuts against the side of yoke 35 and as the tab end of linkage 52 is pressed between arm 49 and its stop 47. As shown in FIG. 2, upon lateral shift of carriage frame 12, linkage tabs 57 assume a slanting position with respect to the faces of the adjacent stops 46, 47. The angular motion of the parallel linkage assembly in response to such lateral shift is permitted by the mechanical working clearance provided by tab slots 58 mounted on shafts 43, 44. Slots 58 are larger than the engaged shafts 43, 44 to accommodate the above described angular motion. The foregoing arrangement alsso requires a slight working clearance between tabs 57 and the adjacent limit stop faces when the assembly is centrally aligned; in this latter status, tabs 57 are parallel to the adjacent limit stop faces. Linkages 51, 52 are made of spring steel to maintain the last-mentioned clearance small in distance, and also to provide some resilient yield to the linkage tabs 57.

Cable offset in the oppposite direction laterally translates counterweight 56 upwardly with correspondingly parallel counterclockwise turning of linkages 51, 52 about their respective pivots.

As noted hereinbefore, counterweight 24 counterbalances the structure to the left of pivot 22 (FIG. 1) to neutralize gravitational effects about the axis of pivot 22 for all positions of the carriage assembly about the cable axis. Spring 25 supplies the contact force to hold probe 11 operatively on cable 15. This force is transmitted to probe 11 via arm 21, parallel arms 48, 49 of member 28 and the two shafts 43, 44 to which arms 48, 49 are mounted. For the foregoing purpose, axis $V_3$ of shafts 43, 44, is directly over the region probe 11 and is designed to contact cable 15.

Reference is now made to FIG. 4, and to the lever system hereinbefore described, which system includes parallel lever linkages 51, 52, pivotally tied to arms 48, 49, for balancing counterweight 56 against the aggregate weight of the carriage assembly supported axially by arms 48, 49. The moment the carriage assembly is indexed away from the vertical plane, i.e., away from position A or the diametrically opposite position D, FIG. 7, gravitational forces are introduced which act upon the mass of the carriage assembly in a direction tending to cause the assembly to slide or tilt off cable 15. Guide wheels 60 do not positively grip cable 15 to hold the carriage assembly operatively attached to the cable as the carriage assembly shifts from a vertical plane about the cable axis. However, guide wheels 60, 60 are under such conditions which maintain same in contact with the cable by the lever system hereinbefore described. The moment the carriage assembly begins to index from a vertical plane, gravity acts on both counterweight mass 56 and the equivalent weight of the carriage assembly mass.

Referring to FIG. 4, as the carriage assembly tilts from the vertical plane, the upper linkage 51 acts as a lever with its fulcrum at its pivot point 53. If a clearance initially exists between the tab end of linkage arm 51 and its stop 46, this clearance is almost instantaneously closed by reason of simultaneous clockwise turning of linkage 51 and downward translation of the carriage assembly along axis $V_3$ with respect to arms 48, 49. The foregoing is in response to gravity acting on the tilting apparatus and results in simultaneous upward travel of the tab end of linkage 51 and downward travel of its limit stop 46 until abutment occurs therebetween. Upon such abutment, the aggregate weight of the carriage assembly mass is counterbalanced by counterweight 56 about the fulcrum of the lever acting linkage 51, whereby the gravitational forces tending to separate the carriage assembly from the cable are nullified. This assures probe sensing operation of the cable for all positions about the cable axis. During the described operation, the bottom linkage 52 acts as a parallel follower.

It is assumed that FIG. 4 depicts linkage 51 as the lever mechanism for operation along positions B, C, etc., that is to say, to the left of the vertical axis of FIG. 7. For tilting the assembly to the right of such axis, linkage 52 serves as the lever mechanism with linkage 51 serving as the follower. Once abutment is established between the lever acting linkage and its limit stop, such abutment continues for all subsequent positions assumed by the carriage as it sweeps alongside of the FIG. 7 vertical axis. It is recalled that the carriage assembly and counterweight 56 laterally shift with respect to each other as described with respect to FIG. 2 to accommodate a change in the lateral position of the cable. Both the lateral shift operation and the lever system operation can occur individually or simultaneously depending upon the existing circumstances.

It is intended that all matter contained in the above description and shown in the accompanying figures shall be interpreted as illustrative and not in any limiting sense.

What is claimed is:

1. An improved electrode probe positioning apparatus of the type wherein a carriage for the probe may be urged into contact with a cable or like elongated article moving along a path, and wherein the apparatus comprises means connected to the carriage for varying the angular position of the carriage about the cable axis and for urging the carriage into operative contact with the cable, wherein the improvement comprises:

a counterweight mass for balancing the weight of the carriage and the probe; and lever means linking said counterweight to the carriage, pivotally mounted on the varying and urging means for movement about an axis generally parallel to a plane defined by the axis of the cable and the angular position of the carriage, said lever engaging the carriage and said counterweight on opposite sides of said pivot axis to counterbalance the force of gravity which may tend to displace the carriage from proper contact with the cable when said plane is varied substantially from a vertical position by the varying and urging means.

2. Apparatus as defined in claim 1 wherein the carriage includes:

axial means for slidable connection with the varying and urging means and with a first side of said pivotal lever means, and limit stop means on said axial means to effect abutment with the first side of said pivotal lever means for regulating its pivotal travel, said carriage having a longitudinal axis substantially parallel to the axis of the elongated cable, the axis of said axial means being substantially perpendicular to said carriage axis, so that gravitational effects upon said carriage and said counterweight result in abutment of said pivotal lever means and stop means as said plane is angularly displaced from a vertical plane by the varying and urging means, whereby such gravitational effects are nullified.

3. Apparatus as defined in claim 1 wherein the carriage includes:

axial means for slidable connection with the varying and urging means and with a first side of said pivotal lever means, and limit stop means on said axial means to effect abutment with the first side of said pivotal lever means for regulating its pivotal travel, said carriage having a longitudinal axis substantially parallel to the axis of the elongated cable, the axis of said axial means being substantially perpendicular to said carriage axis, so that pivotal movement of said lever means about said pivot axis allows lateral displacement of the carriage relative to the varying and urging means by slidable movement along said axial means.

4. Apparatus as defined in claim 1 wherein the carriage includes:

axial means for slidable connection with the varying and urging means and with a first side of said pivotal lever means, and limit stop means on said axial means to effect abutment with the first side of said pivotal lever means for regulating its pivotal travel, said carriage having a longitudinal axis substantially parallel to the axis of the elongated cable, the axis of said axial member being substantially perpendicular to said carriage axis, said pivotal lever means engaging said axial means between said limit stop means and said carriage varying and urging means, so that said carriage is laterally translatable with respect to its axis and relative to said varying and urging means and also counterbalanced for positions of said plane angularly displaced from the vertical by abutment of the first side of said lever means with said limit stop means.

5. Apparatus for mounting an electrode probe on cable or like elongated article moving along a path relative to the probe comprising:

a carriage assembly mountable on the elongated cable and defining a first mass, said assembly including an electrode probe and aligned axial members extending outwardly from respective sides of said assembly, a limit stop on each axial member, carriage supporting means for urging said probe into operative contact with said cable and having a pair of parallel arms each slidably mounted on a respective axial member, a counterweight mass for balancing said first mass, and individual levers pivoted to respective ones of said parallel arms for linking said counterweight to said assembly, each of said individual levers being slidably mounted on a respective one of said axial members adjacent the limit stop thereof on a first side of its pivot axis and also rotatably connected to a respective side of said counterweight on the other side of its pivot axis, and abutment between the first-mentioned side of at least one lever and an adjacent limit stop results in a balanced status between said carriage assembly and said counterweight for holding said probe in operative contact with said cable regardless of the angular position of the probe about the cable axis.

6. Apparatus as defined in claim 5, wherein:

said carriage assembly has a longitudinal axis coextending with the axis of the elongated cable, the axis of said axial members being substantially perpendicular to said carriage assembly axis, and gravitational effects upon said carriage assembly and said counterweight results in abutment of at least one of said levers and its respective limit stop as said carriage assembly is angularly displaced from a vertical plane, whereby such gravitational effects are nullified.

7. Apparatus as defined in claim 5, wherein:

said carriage assembly has a longitudinal axis coextending with the axis of the elongated cable, the axis of said axial members being substantially perpendicular to said carriage assembly axis, and pivotal movement of said levers about their axes allows lateral displacement of said carriage assembly with respect to its axis and relative to said carriage supporting means.

References Cited

UNITED STATES PATENTS

| | | | |
|---|---|---|---|
| 2,872,640 | 2/1959 | Eppler | 324—61 |
| 2,898,550 | 8/1959 | Fischer | 324—61 |
| 3,311,819 | 3/1967 | Miller | 324—37 |

EDWARD E. KUBASIEWICZ, Primary Examiner

J. M. HANLEY, Assistant Examiner